Sept. 13, 1960 L. A. CARLSON 2,952,101
DRILL SHARPENER AND METHOD
Filed April 8, 1958 2 Sheets-Sheet 1
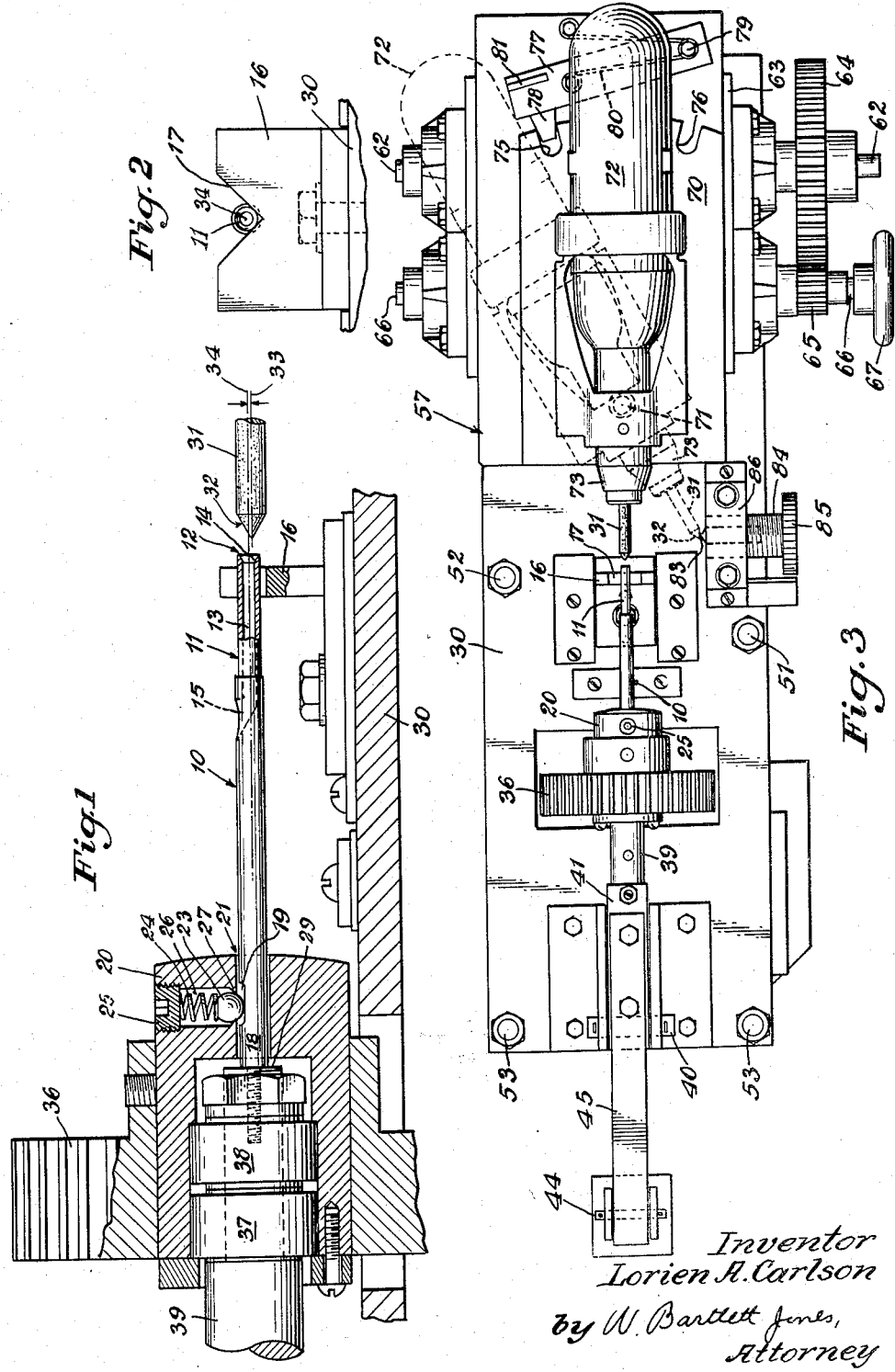
Inventor
Lorien A. Carlson
by W. Bartlett Jones,
Attorney

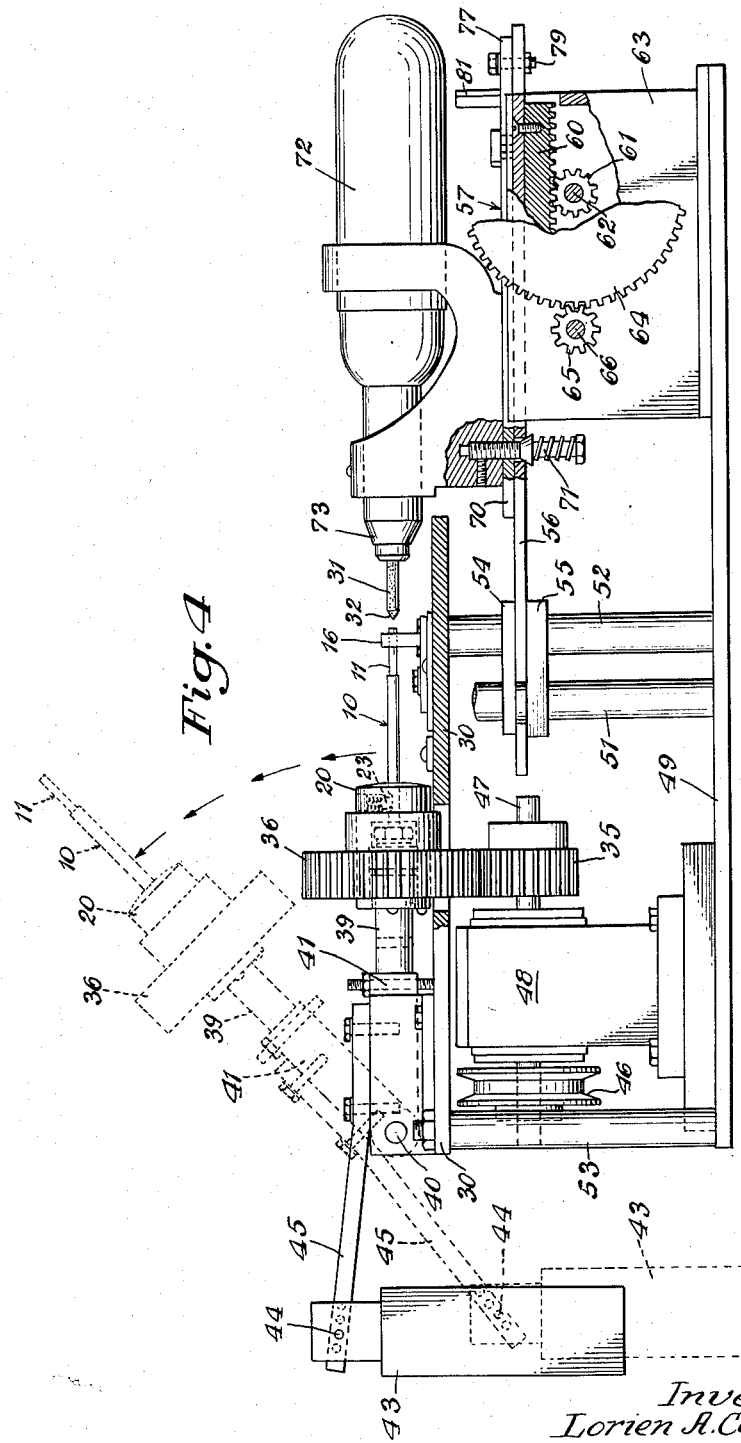

United States Patent Office 2,952,101
Patented Sept. 13, 1960

2,952,101

DRILL SHARPENER AND METHOD

Lorien A. Carlson, Cloquet, Minn., assignor to Wood Conversion Company, St. Paul, Minn., a corporation of Delaware Filed Apr. 8, 1958, Ser. No. 727,125

11 Claims. (Cl. 51—105)

The present invention relates to sharpening drills having a terminal conoidal wall. In particular it relates to method and apparatus for sharpening such drills which may have lateral eccentricity.

Hollow drills of the type to which the invention relates are commonly used in drilling holes in fiberboard to form acoustic tile. Such drills are cylindrical or slightly tapered toward the cutting end and the end of the exterior wall terminates in a circular cutting edge with an internal conoidal wall leading to the hollow interior. The cut slug moves into the hollow interior for discharge through an opening in the shank of the drill. Such drills are mounted for rotation at the other end. An elongated shank is provided for numerous mechanical reasons, including structure for discharging slugs. Because of the small size of hole required for acoustic tile, the drills are generally long and slender.

Heretofore, such drills have been sharpened by fixing the mounting end of the drill in a suitable rotary chuck and relatively advancing a rotating grinding tool onto the frusto-conical section. One way for example, is to employ a small cylindrical stone of diameter to enter the hollow end, with its axis angular to the axis of the drill so that the geometrical element of the stone is the grinding line for the conoidal surface.

Practically, it is expensive to produce and to maintain such drills with axes perfectly coaxial at the two ends of the drill. Commercial tolerances are allowed, for example, a lateral offset of 0.006 inch for a drill with a cutting end 5/32 inch in outside diameter. When such an eccentric drill is mounted at its idle end for rotation to sharpen its working end by a grinding tool, problems are encountered. Were the drill perfectly mounted coaxially at its mounting end, the eccentricity would create wobble at the cutting end, resulting in imperfect eccentric sharpening.

It is the object of the present invention to provide a method and apparatus for sharpening such drills which may and may not have lateral eccentricity.

It is a particular object to provide apparatus in which a large number of such drills may be expeditiously sharpened.

Various other and ancillary objects and advantages of the invention will appear in the following description and explanation of the invention as illustrated by the accompanying drawings, in which:

Fig. 1 is a fragmentary enlarged vertical cross-section of the machine taken on its main axis to show the relation of the drill to its grinding element.

Fig. 2 is a side elevation of a part of Fig. 1 looking at the supported end of a drill.

Fig. 3 is a plan view of the machine showing the grinder in grinding alinement and in dotted lines in dressing position.

Fig. 4 is a side elevation of the machine as shown in Fig. 2 with a part broken away to show the feeding mechanism for the grinder carriage.

Although the description is directed to sharpening hollow drills, it is to be understood that an external conoidal wall may be resurfaced in the same way.

In principle, the invention contemplates that the drill to be sharpened be positioned in the vicinity of the cutting end so that the working end of the axis is fixed against lateral movement during rotation. When such a drill has eccentricity, it follows that the other end of the drill may not be mounted and rotated with that end of the drill axis likewise fixed against lateral movement, unless the drill is strained during rotation.

Accordingly, the invention contemplates that the mounted and driven end of the drill be free to wobble laterally while the end being sharpened has its axis fixed. This may be accomplished in one way as illustrated in Figs. 1 and 2. Numeral 10 represents a hollow drill having a nearly cylindrical outer wall 11 terminating in circular cutting edge 12. The interior 13 is hollow and is connected to the cutting edge by interior conoidal wall 14. Grinding away on the wall 14 sharpens the drill. The interior 13 connects with a discharge port 15 in the side wall of the drill.

Numeral 16 is functionally a bearing for the rotating drill 10. It is located in the vicinity of the cutting end so as to fix the axis at the cutting end against lateral movement during rotation. It has the form of an anvil with a V-recess 17 to provide the positioning and bearing walls for the drill. The bearing is open at the top to permit rapid insertion and removal of the drill, and in use the function of the bearing 16 is augmented by pressure of the operator's finger as well as pressure from the grinder to hold the drill in the bottom of the recess 17.

The drills 10 are provided at the other end with a recess 19 useful in conventionally mounting the drills for drilling. Fig. 1 shows a rotary chuck 20 coaxial with the position of the axis of a drill resting in the bearing 16. It has an opening 21 for the end 18 of the drill but larger than the end of the drill so that there is clearance for an eccentric drill to wobble when its cutting end is restrained from wobbling. The chuck has a movable ball 23 to lie in recess 19 for driving the drill. The ball 23 is pressed by spring 24 between it and a screw 25 in a bore 26 in the chuck. A lip 27 retains the ball in the bore. Rearwardly of the opening 19 is a back-stop 29 for the end of the drill, against which the drill is urged endwise by the pressure of a grinding body which is movable relatively to the drill and endwise thereof.

Preferably the drill is rotated in an axially stationary position relative to the frame of the machine, of which a bed-plate is designated 30 in Fig. 1, and the grinder moves onto the end of the drill. The grinding body is designated 31 and has a conoidal grinding face 32 complementary to the conoidal wall 14. At the cutting end of the rotating drill, its axis and the conoidal grinding face 32 are both fixed and parallel, but the axes of the drill and of the grinding body are slightly offset, for example, by about 0.03 inch, preferably with the grinder axis 33 vertically lower than the drill axis 34. Thereby, in rotating both the drill and the grinder, grinding contact may be effected at coincident geometrical elements of the two conoidal surfaces, and opposite that line of contact there is maximum clearance between the two surfaces for escape of grinding dust. By the preferred offset of the two axes the pressure of the grinder 31 on the drill holds the drill in the anvil 16.

For expeditious use of the machine other features are incorporated. One feature is the mounting of the chuck. It is movable from its grinding position into a loading position to facilitate entering and removing drills. It is preferably arranged so that when it is in grinding position it is engaged with a continuously rotating member, from which it is disengaged by merely moving it out of grinding position.

The foregoing result may be accomplished by providing a driving gear 35, (Fig. 4) bearing in the framework, and a driven gear 36 concentrically secured to chuck 20, the two meshing in grinding position. Chuck 20 bears internally on ring bearings 37 and 38 over stub shaft 39 fixed in the framework and coaxial with the true grinding axis at the anvil 16. As shown, the gears 35 and 36 have their axes vertically alined to separate them by upward movement of gear 36 in moving the chuck into loading position.

The upward movement is effected by vertical swinging of the mounting for the chuck about a horizontal pivot 40 passing through a casing 41 in which stub shaft 39 is mounted. By up-swinging the chuck to an angle of about 45° the drills may be conveniently inserted and removed without regard for anvil 16. To facilitate lifting and for other reasons, the chuck mounting is counterbalanced by a weight 43 hanging by pivot 44 from bar 45 horizontally crossing the vertical line of pivot 40 and secured to the top of casing 41. The counterweight is so adjusted that in grinding position the weight of the chuck fixes the position, and such that on vertical upswing the center of gravity shifts as the depending counterweight 43 pivots, so that it holds a loading position of rest, leaving the operator's hands free for exchanging drills in the chuck. A sharpened drill is merely withdrawn and a dull one inserted, the hand pressure overcoming the locking force of ball 23. When the chuck is in grinding position with the drill in the anvil, merely holding the drill against rotation will bring the ball 23 into recess 19 and effect positive rotation. A drill-speed of about 60 r.p.m. is suitable with a high-speed grinder. This speed is controlled by the driving of a pulley 46 on shaft 47 which carries gear 35, the shaft having bearing 48 secured to the base 49 of the machine.

The base 49 near its lengthwise center has two vertical posts 51 and 52 which as seen in Fig. 4 support the bed-plate 30, in the same way as end post 53 supports the bed-plate, the locations of the posts appearing in Fig. 3, as their threaded ends extending through holding nuts. Posts 51 and 52 hold two horizontally spaced plates 54 and 55, which serve as guides for a plate 56 forming part of a movable carriage 57 carrying the grinder.

The carriage 57 is movable in the direction of the axis of the chuck 20, by a hand control. The underside of the carriage has a pair of toothed racks 60, one being shown in Fig. 4, meshing with spur gears 61 on shaft 62, within parallel side plates 63 of which one is shown in Fig. 4. Shaft 62 extends through side plate 63 and bears a large gear 64 meshing with small gear 65 on shaft 66, terminating in hand wheel 67. Thus, small increments of advance of the grinder are possible.

The carriage 57 has a horizontal plate 70, which turns on a vertical axis provided by pivot 71. The plate 70 is integral with a grinding unit comprising a housed motor 72 and a chuck 73 for the grinding element 31. Plate 70 has two notches 75 and 76 at the rear for a latch member 77, having detent 78 shown as entered in notch 75. The latch member 77 is pivoted at 79, and is urged into latching position by spring 80. Finger lug 81 is provided to facilitate release of the latch. As shown, the latch in notch 75 holds the grinder in tool-grinding position.

By swinging plate 70 to engage notch 76, the grinder assumes the position shown in dotted lines. This position is such that the conoidal wall 32 of the grinder 31 presents an outermost geometrical element located parallel to the working axis of the machine. In this position the grinder carriage 57 may be moved by handwheel 67 to dress the grinding wall 32 by a suitable tool such as diamond point 83. The latter is mounted in a threaded carrier 84 with knurled hand-wheel 85 for moving the point 83 in a mounting 86 across the axis of the machine.

By internally grinding the conoidal wall of the drill by a conoidal wall of a grinding element, the latter is efficiently employed. When the grinding element is dressed, it is merely shortened and always presents the same character of grinding surface to the tools.

The vertical offset of the axes as shown in Fig. 1 is increased when the conoidal wall is on the exterior of the drill. This may be readily accomplished in one way by increasing the spacing between bases 56 and 30, by means not shown.

It is to be understood that the preferred form shown and described is merely illustrative of the invention, and that numerous changes and modifications are contemplated as falling within the scope of the invention as set forth in the appended claims.

I claim:

1. The method of sharpening a drill having at its cutting end a terminal conoidal wall of predetermined angularity, which comprises positioning the drill in the vicinity of said end so that the drill may be rotated with its axis at the cutting end fixed against lateral movement during rotation, mounting the other end of the drill for rotation, slowly rotating said mounted end of the drill, and in a direction parallel to the axis of the cutting end relatively advancing onto said conoidal wall a rotating grinding body having conoidal grinding face of said predetermined angularity and an axis of rotation parallel to and offset from the axis of said cutting end of the drill.

2. Apparatus for sharpening a drill having at its cutting end a terminal conoidal wall of predetermined angularity, comprising bearing means for mounting said drill in the vicinity of said cutting end with the axis at said end in a fixed position, rotary means having a fixed axis, said rotary means being adapted to fix the drill endwise at the other end and to engage said other end for rotation with freedom for lateral movement of said engaged end to accommodate any lateral eccentricity of the drill, an elongated grinding body mounted for rotation on an axis offset from and parallel to the axis of said rotary means, said grinding body having a conoidal grinding face of said predetermined angularity, power means to rotate the grinding body for grinding said drill, mounting means for said grinding body, said rotary means for engaging and rotating the drill and said mounting means for the grinding body being relatively movable toward and away from each other relatively to move said cutting end and said grinding body toward and away from each other along their parallel axes, and means to effect said relative movement.

3. Apparatus according to claim 2 in which said bearing means is an anvil having a V-shaped recess positioned to locate the axis of the cutting end of the drill parallel to and offset from the axis of said grinding body.

4. Apparatus according to claim 2 in which said rotary means for engaging and rotating the drill has a circular recess with its axis parallel to the axis of said grinding body for receiving the non-working end of the drill, said recess being larger in diameter than said end of the drill whereby the drill may move therein at right angles to the drill axis, and spring-actuated means within the recess for engaging the side wall of the drill for endwise fixation, for rotating the drill and for permitting lateral movement of the rotating drill in said recess.

5. Apparatus according to claim 2 in which there is a fixed frame, in which said rotary means for engaging and rotating the drill is fixed relative to said frame during rotation of the drill thereby, and in which the mounting means for the grinding body is movable relative to said frame along the axis of the grinding body.

6. Apparatus for sharpening a tubular drill having an outermost circular cutting edge and a conoidal wall of predetermined angularity extending from said edge to the wall of the hollow interior, comprising bearing means for mounting said drill in the vicinity of the cutting end with the axis at said end in a fixed position, rotary power means for engaging and rotating the drill and for fixedly mounting the drill endwise at the other end with freedom for lateral movement of that end of the drill to accommodate any lateral eccentricity of the drill, an elongated grinding body mounted for rotation on an axis offset from and parallel to the axis of said power means, said body having a conoidal grinding end face of said predetermined angularity, means to rotate the grinding body for grinding said conoidal wall, mounting means for said grinding body, said power means for the drill and said mounting means for the grinding body being relatively movable toward and away from each other relatively to move said cutting edge and said grinding body toward and away from each other along their parallel axes, and means to effect said relative movement.

7. Apparatus for sharpening a tubular drill having an outermost circular cutting edge and a conoidal wall of predetermined angularity extending from said edge to the wall of the hollow interior, comprising bearing means for mounting said drill in the vicinity of the cutting end with the axis at said end in a fixed position, rotary power means for engaging and rotating the drill and for fixedly mounting the drill endwise at the other end with freedom for lateral movement of that end of the drill to accommodate any lateral eccentricity of the drill, and movable grinding means to act upon said conoidal wall when the cutting end of the drill rotates in said bearing, said bearing being open on one side for entry and exit of the drill laterally of its extent, said means for engaging and rotating the drill having a fixed position for holding the drill in said bearing during rotation thereof and being movable into and out of said fixed position in directions laterally to enter and to remove said drill from said bearing via said open side.

8. Apparatus for sharpening a drill having at its cutting end a terminal conoidal wall of predetermined angularity, comprising bearing means for mounting said drill in the vicinity of said cutting end with the axis at said end in a fixed position, rotary means having said axis, said rotary means being adapted to fix the drill endwise at the other end and to engage said other end for rotation with freedom for lateral movement of said engaged end to accommodate any lateral eccentricity of the drill, an elongated grinding body mounted for rotation on an axis offset from and parallel to the axis of said rotary means, said grinding body having a conoidal grinding face of said predetermined angularity, power means to rotate the grinding body for grinding said drill, mounting means for said grinding body and the power means therefor, said rotary means for engaging and rotating the drill and that for the grinding body being relatively movable toward and away from each other along said parallel axes, means to effect said relative movement, said mounting means for the grinding body being movable to a position wherein a geometrical element of said conoidal grinding face is parallel to the axis of the grinding body in its grinding position, a dressing tool for said grinding body, and mounting means for said dressing tool, said tool having a dressing end positionable for relative movement along said geometrical element in its said position parallel to the grinding axis, said tool and said mounting means for the grinding body in said position being relatively movable to dress said grinding face during rotation of the grinding body.

9. Apparatus for sharpening a drill having at its cutting end a terminal conoidal wall of predetermined angularity, comprising a frame, bearing means fixed to said frame for mounting said drill in the vicinity of said cutting end with its axis at said end in a fixed position, rotary means carried by said frame and having relative to said frame and during rotation a fixed axis position to the coaxial with the cutting end of a drill positioned in said bearing, said rotary means being adapted to engage and fix the drill endwise at the other end and to rotate the drill, an elongated grinding body mounted for rotation and grinding on an axis offset from and parallel to the axis of said rotary means, said grinding body having a conoidal grinding face of said predetermined angularity, power means to rotate the grinding body for grinding said conoidal wall, mounting means carried by said frame for said grinding body and said power means, said rotary means for engaging and rotating the drill and said mounting means for the grinding body and its said power means being relatively movable toward and away from each other along said parallel axes, means to effect said relative movement, a dressing tool carried by said frame for dressing said grinding body, said mounting means being movable with respect to said frame to a position wherein a geometrical element of the conoidal grinding face is parallel to the axis of its grinding position, said tool having a dressing end positionable for relative movement along said geometrical element in the latter's said position parallel to the grinding axis, whereby said tool and said mounting means may be moved relatively to dress said grinding face during rotation of the grinding body.

10. Apparatus for sharpening a tubular drill having an outermost circular cutting edge and a conoidal wall of predetermined angularity extending from said edge to the wall of the hollow interior, comprising bearing means for mounting said drill in the vicinity of the cutting end with the axis at said end in a fixed position, rotary power means for engaging and rotating the drill and for fixedly mounting the drill endwise at the other end with freedom for lateral movement of that end of the drill to accommodate any lateral eccentricity of the drill, movable grinding means to act upon said conoidal wall when the cutting end of the drill rotates in said bearing, said bearing being open on one side for entry and exit of the drill laterally of its extent, said means for engaging and rotating the drill having a fixed position for holding the drill in said bearing during rotation thereof and being movable into and out of said fixed position in directions laterally to enter and to remove said drill from said bearing via said open side, said rotary power means comprising a driven gear for rotating the drill, and a driving gear for meshing with said driven gear, said two gears meshing when said rotary power means is in said fixed position and being separated in moving said rotary power means out of said fixed position.

11. The method of sharpening a drill having at its cutting end a terminal conoidal wall of predetermined angularity, which comprises positioning the drill in the vicinity of said end so that the drill may be rotated with its axis at said end fixed against lateral movement during rotation, mounting the other end of the drill for rotation, rotating said mounted end of the drill, and in a direction parallel to the axis of the rotating cutting end relatively advancing onto the conoidal wall of the drill, a rotating grinding body having a conoidal grinding face of said predetermined angularity and a grinding axis parallel to and offset from the axis of the rotating cutting end of the drill.

References Cited in the file of this patent

UNITED STATES PATENTS

| 1,334,898 | Gyllsdorff | Mar. 23, 1920 |
| 2,068,915 | Hardin | Jan. 26, 1937 |

FOREIGN PATENTS

| 319,643 | Germany | Mar. 12, 1920 |

UNITED STATES PATENT OFFICE
CERTIFICATE OF CORRECTION

Patent No. 2,952,101                     September 13, 1960

Lorien A. Carlson

It is hereby certified that error appears in the printed specification of the above numbered patent requiring correction and that the said Letters Patent should read as corrected below.

Column 6, line 2, for "position to the" read -- positioned to be --.

Signed and sealed this 4th day of April 1961.

(SEAL)
Attest: ERNEST W. SWIDER

Attesting Officer

ARTHUR W. CROCKER
Acting Commissioner of Patents